United States Patent
Sgarz et al.

(10) Patent No.: US 10,613,194 B2
(45) Date of Patent: Apr. 7, 2020

(54) HAND TOOL DEVICE HAVING AT LEAST ONE LOCATING DEVICE

(71) Applicant: Robert Bosch GmbH, Stuttgart (DE)

(72) Inventors: Heiko Sgarz, Leonberg (DE); Martin Pohlmann, Stuttgart (DE); Jan-Michael Brosi, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 730 days.

(21) Appl. No.: 14/363,687

(22) PCT Filed: Oct. 30, 2012

(86) PCT No.: PCT/EP2012/071479
§ 371 (c)(1),
(2) Date: Jun. 6, 2014

(87) PCT Pub. No.: WO2013/087282
PCT Pub. Date: Jun. 20, 2013

(65) Prior Publication Data
US 2014/0347210 A1    Nov. 27, 2014

(30) Foreign Application Priority Data

Dec. 13, 2011  (DE) .................. 10 2011 088 439

(51) Int. Cl.
*G01S 7/02* (2006.01)
*G01S 13/88* (2006.01)
(Continued)

(52) U.S. Cl.
CPC .............. *G01S 7/026* (2013.01); *G01S 13/06* (2013.01); *G01S 13/888* (2013.01); *G01V 3/12* (2013.01); *G01V 3/15* (2013.01); *H01Q 9/27* (2013.01)

(58) Field of Classification Search
CPC ............................... G01S 7/026; G01S 13/888
See application file for complete search history.

(56) References Cited

U.S. PATENT DOCUMENTS 4,005,414 A * 1/1977 Goggins, Jr. .......... G01S 7/024
                                                        342/188
4,728,897 A    3/1988 Gunton
(Continued)

FOREIGN PATENT DOCUMENTS

DE    10 2007 062 997 A1    6/2009
DE    10 2008 041 651 A1    3/2010
(Continued)

OTHER PUBLICATIONS

Pochanin, Gennadiy P. "Large Current Radiator for the Short Electromagnetic Pulses Radiation." in Ultra-Wideband Short-Pulse Electromagnetics 4; 2002. pp. 149-155. DOI 10.1007/0-306-47093-4_16.*

(Continued)

*Primary Examiner* — Matthew M Barker
(74) *Attorney, Agent, or Firm* — Maginot, Moore & Beck LLP

(57) ABSTRACT

A hand tool device comprises a computation unit and at least one locating device that is configured to receive a locating signal having a circularly polarized component. The computation unit is configured to ascertain a piece of position information of a locatable object from the circularly polarized part of the locating signal.

6 Claims, 4 Drawing Sheets

(51) Int. Cl.
  *G01V 3/12* (2006.01)
  *G01S 13/06* (2006.01)
  *G01V 3/15* (2006.01)
  *H01Q 9/27* (2006.01)

(56) References Cited

U.S. PATENT DOCUMENTS

| | | | | |
|---|---|---|---|---|
| 5,541,605 A | * | 7/1996 | Heger | G01S 7/03 342/22 |
| 5,680,048 A | | 10/1997 | Wollny | |
| 5,854,603 A | | 12/1998 | Heger | |
| 5,905,455 A | * | 5/1999 | Heger | G01S 7/03 342/142 |
| 6,657,577 B1 | | 12/2003 | Gregersen et al. | |
| 7,345,618 B1 | * | 3/2008 | Cole | G01S 13/32 342/22 |
| 7,800,527 B2 | | 9/2010 | Douglass | G01S 7/024 342/175 |
| 8,106,812 B2 | * | 1/2012 | Andersson | G01S 13/0209 342/22 |
| 2005/0012655 A1 | * | 1/2005 | Lalezari | G01S 13/48 342/62 |
| 2005/0225482 A1 | | 10/2005 | Stephens | |
| 2006/0087385 A1 | * | 4/2006 | Fitzpatrick | G01S 7/026 333/117 |
| 2010/0207803 A1 | | 8/2010 | McMakin et al. | |
| 2011/0115674 A1 | * | 5/2011 | Lackey | G01S 7/026 342/361 |
| 2011/0181483 A1 | | 7/2011 | Krapf et al. | |

FOREIGN PATENT DOCUMENTS

| | | | |
|---|---|---|---|
| DE | 10 2008 054 456 A1 | 6/2010 | |
| WO | WO 2010023152 A1 * | 3/2010 | H01Q 7/00 |

OTHER PUBLICATIONS

Polarization—EM Waves and Antennas. Dec. 8, 2011. Retrieved from https://web.archive.org/web/20111208041234/http://www.antenna-theory.com/basics/polarization.php (Year: 2011).*
International Search Report corresponding to PCT Application No. PCT/EP2012/071479, dated Aug. 14, 2013 (German and English language document) (7 pages).

* cited by examiner

HAND TOOL DEVICE HAVING AT LEAST ONE LOCATING DEVICE

This application is a 35 U.S.C. § 371 National Stage Application of PCT/EP2012/071479, filed on Oct. 30, 2012, which claims the benefit of priority to Serial No. DE 10 2011 088 439.4, filed on Dec. 13, 2011 in Germany, the disclosures of which are incorporated herein by reference in their entirety.

BACKGROUND

A handheld tool apparatus having a computation unit and at least one locating apparatus that is provided for the purpose of at least receiving a locating signal has already been proposed.

SUMMARY

The disclosure is based on a handheld tool apparatus having a computation unit and at least one locating apparatus that is provided for the purpose of at least receiving a locating signal.

It is proposed that the computation unit is provided for the purpose of ascertaining at least one piece of position information for a locatable object by means of determination of a circularly polarized component of the locating signal. A "computation unit" is intended to be understood to mean particularly a unit having an information input, an information processing section and an information output section. Preferably, the information input comprises at least one analog-to-digital converter that digitizes the component of the locating signal during operation. The computation unit has at least one processor, a memory, input and output means, further electrical parts, an operating program and/or at least one computation routine. Preferably, the parts of the computation unit are arranged on a common board and/or are advantageously arranged in a common housing. Advantageously, the locating apparatus determines at least whether there is a locatable object in a locating range of the locating apparatus. With particular advantage, the locating apparatus determines at least one distance between the locating apparatus and the locatable object. In particular, a "locating apparatus" comprises an antenna that, during operation, transmits a locating signal and receives a component of the locating signal that is reflected by the locatable object. Furthermore, a "locating signal" is intended to be understood to mean particularly a signal that the locating apparatus transmits in order to locate the locatable object. Preferably, the locating signal has a bandwidth of more than 500 MHz, advantageously more than 1 GHz, particularly advantageously more than 2 GHz. Alternatively, the locating apparatus could send a narrowband locating signal, which allows an embodiment that is particularly simple in terms of design. The term "receive" is intended to be understood to mean particularly that the locating apparatus converts a portion of an energy in the locating signal reflected by the locatable object from an electromagnetic wave that is disseminated by an insulator and/or a vacuum into a wave that is carried in an electrical conductor. In addition, "provided" is intended to be understood to mean particularly specifically programmed, designed and/or equipped. A "circularly polarized component of the locating signal" is intended to be understood to mean particularly at least one portion of an energy in the locating signal whose absolute value for an electrical field vector is constant at least at one frequency. Preferably, the field vector rotates through 360 degrees within one period of the frequency. With particular advantage, a circularly polarized component of the locating signal is 3 dB greater than a linearly polarized component of the locating signal during transmission. In particular, "determination of a circularly polarized component of the locating signal" is intended to be understood to mean any of the following three definitions and also combinations of the definitions that appear useful to a person skilled in the art. First, during operation, the computation unit quantizes a circularly polarized component of the locating signal that the locating apparatus combines from two components of the locating signal that are received with linear polarization, in particular that are orthogonal with respect to one another. Secondly, the computation unit quantizes a component of the locating signal that is received by a locating antenna of the locating apparatus with direct circular polarization. Advantageously, thirdly, the computation unit quantizes two components of the locating signal that are received with linear polarization, in particular that are orthogonal with respect to one another, and calculates therefrom the component of the locating signal that is received with circular polarization. In particular, a piece of "position information" is intended to mean a piece of information that describes at least one arrangement to at least one portion of the locatable object relative to the locating apparatus during a locating process. Preferably, the position information describes a distance for the locatable object, an orientation of the locatable object, a shape for the locatable object and/or a direction in which the locatable object is arranged relative to the locating apparatus. A "locatable object" is intended to be understood to mean particularly a part that is in a concealed arrangement in a workpiece, for example in a wall, and that has at least one electromagnetic property that differs from that of the workpiece, for example a power line, a water conduit, a support and/or a piece of reinforcing ironwork. In particular, the term "ascertain" is intended to be understood to mean that the computation unit calculates at least one piece of position information for the locatable object from at least one characteristic quantity of the circularly polarized component of the locating signal. The inventive embodiment of the handheld tool apparatus allows a reflection of the locating signal at a surface of the workpiece and at other extensive layers of the workpiece to be advantageously suppressed. This allows particularly reliable and accurate locating of the locatable object.

The locating apparatus has a locating antenna that is provided for the purpose of receiving at least two orthogonal polarization directions for the locating signal, as a result of which it is possible to use an advantageously embodied locating antenna to determine the circularly polarized component of the locating signal and further information for the locatable object. A "locating antenna" is intended to be understood to mean particularly an antenna that, in at least one operating state, transmits and particularly receives a signal for locating the locatable object. In particular, the locating antenna has a 3 dB beam angle of less than 60 degrees, advantageously less than 45 degrees, particularly advantageously less than 30 degrees. Advantageously, the locating antenna has a gain of greater than 3 dBi, particularly advantageously greater than 6 dBi, in at least one portion of a frequency range of the locating signal. Preferably, the locating antenna is provided for the purpose of transmitting a wideband locating signal. In particular, "wideband" is intended to be understood to mean that an amplitude of a transmitted, reflected and received locating signal has a discrepancy of less than −10 dB from a maximum amplitude of the locating signal in a frequency range that comprises at least 25%, advantageously at least 50%, of a center frequency of the frequency range. Preferably, the center frequency is situated between 500 MHz and 12 GHz, particularly preferably between 1 and 6 GHz. "Orthogonal polarization directions" are intended to be understood to mean particularly polarization directions that are independent of one another, specifically particularly a left-rotating and a right-rotating circular polarizing direction or two linear polarization directions with electrical vectors oriented at right angles with respect to one another. The expression "receive two orthogonal polarization directions" is intended to be understood to mean particularly that the locating antenna is provided for the purpose of receiving two orthogonally polarized portions of the locating signal and outputting them at separate feed points. Preferably, the locating antenna has an antenna gain with a difference of less than of less than 10 dB, advantageously less than 6 dB, particularly advantageously less than 3 dB, in the at least two polarization directions. Preferably, the locating antenna has a maximum of sensitivity in each of the two orthogonal polarization directions. A "feed point" is intended to be understood to mean particularly a point on the locating antenna at which the locating signal is fed into the locating antenna for the purpose of transmission and output by the locating antenna following reception.

Furthermore, it is proposed that the computation unit is provided for the purpose of determining the circularly polarized component of the locating signal from the at least two received linear polarization directions of the locating signal, which means that a circularly polarized component of a wideband locating signal can be determined in a manner that is simple in terms of design. In particular, the expression "determine the circularly polarized component of the locating signal" is intended to be understood to mean that the computation unit quantizes the two received linear polarization directions of the locating signal separately from one another and calculates the circularly polarized component of the locating signal from the quantized polarization directions of the locating signal.

In addition, it is proposed that the computation unit is provided for the purpose of determining the circularly polarized component of the locating signal from at least one copolarization parameter and at least one cross-polarization parameter for the reflected locating signal, which allows the circularly polarized component to be determined using advantageously low computation power. In particular, a "copolarization parameter" is intended to be understood to mean a scattering parameter that describes at least one reflection of the locatable object without a change in the polarization direction. Preferably, the computation unit determines the copolarization parameter by comparing the locating signal sent with a polarization direction and a reflection of the locating signal, received with an identical polarization direction. A "cross-polarization parameter" is intended to be understood to mean particularly a scattering parameter that describes at least one change in the polarization direction of the locating signal that is caused by the locatable object. Preferably, the computation unit determines the cross-polarization parameter by comparing the locating signal sent with a first polarization direction and a received reflection of the locating signal that has a second polarization direction, which is orthogonal with respect to the first polarization direction. A "scattering parameter" is intended to be understood to mean particularly a description of a reflection of the locating signal at the locatable object that comprises at least information about an amplitude and a phase angle of the reflected component of the locating signal. Preferably, the scattering parameter describes a difference between the sent locating signal and the reflected component of the locating signal, specifically particularly in the form of a complex value. In particular, the computation unit determines a scattering parameter by comparing a sent locating signal and received components of the locating signal in complex fashion.

In addition, it is proposed that the locating apparatus has at least one feed point for receiving each, in particular linear, polarization direction, which means that it is possible to achieve signal routing that is simple in terms of design. Preferably, the locating antenna is provided for the purpose of receiving two orthogonal polarization directions essentially without influence from the respective other polarization direction. In particular, "essentially without influence" is intended to be understood to mean that overcoupling from one polarization direction to the other polarization direction is less than −10 dB, advantageously less than −20 dB, particularly less than −30 dB. Preferably, the locating apparatus has four feed points, with the locating antenna preferably radiating a locating signal with the same polarization direction when feeding two feed points that are arranged opposite, in particular.

In addition, it is proposed that the locating apparatus is provided for the purpose of exciting a single feed point, which allows particularly accurate locating. In particular, the locating signal can be sent with different radiation directions. The expression "exciting a single feed point" is intended to be understood to mean particularly that, in an operating state, a signal generator of the locating apparatus radiates the locating signal to the locating antenna of the locating apparatus via one of the feed points. Alternatively or in addition, the signal generator could excite the locating antenna in balanced or unbalanced fashion via two feed points.

In one advantageous form of the disclosure, it is proposed that the locating apparatus is in the form of an LCR antenna, which allows a particularly small physical size and a radiation characteristic that is advantageous over a large bandwidth. Furthermore, an "LCR antenna (Large-Current-Radiator-Antenna)" is intended to be understood to mean particularly an antenna that has a radiating element that carries a large current during operation. Preferably, an antenna element surface of the LCR antenna has a characteristic impedance of less than 20 ohms, advantageously less than 10 ohms, particularly advantageously less than 5 ohms. Preferably, a magnetic component of the locating signal is at least twice as large as an electrical component of the locating signal in the near field of the locating antenna. Preferably, the locating antenna is oriented symmetrically with respect to a plane of symmetry, the plane of symmetry being oriented at right angles to the radiating element. The locating antenna is advantageously formed at least in part by a, in particular corrosion-resistant, metal sheet, particularly by a bent metal sheet, such as a metal sheet of a stainless steel and/or a zinc-plated and/or gold-plated sheet, etc. Alternatively, it is conceivable for the locating antenna to be in the form of a plastic body, with surfaces and/or subregions, particularly for the purpose of routing signals, being metalized at least in part, it being necessary to take into account a specific dielectric constant of the plastic body during design and/or calculation of the locating antenna. Alternatively, the locating antenna could be in the form of a patch antenna and/or in the form of a dipole-like antenna.

In a further embodiment, it is proposed that the locating apparatus is provided for the purpose of outputting a circularly polarized component of the locating signal, which allows simple quantization of the locating signal. Advantageously, the locating apparatus has a radio-frequency circuit that determines a circularly polarized component of the locating signal from two linearly polarized components of the locating signal. Preferably, the computation unit quantizes the circularly polarized component of the locating signal that is determined by the locating apparatus.

Furthermore, it is proposed that the locating apparatus has a locating antenna that is provided for the purpose of directly receiving the circularly polarized component of the locating signal, which means that it is possible to use radio-frequency electronics that are particularly simple in terms of design. Preferably, the locating antenna has a maximum sensitivity when receiving a circularly polarized signal, for example a helical antenna, a spiral antenna and/or another circular antenna that appears useful to a person skilled in the art.

In addition, the disclosure is based on a handheld locating appliance having a handheld tool apparatus according to the disclosure. A "handheld locating appliance" is intended to be understood to mean particularly an appliance that is provided for the purpose of detecting elements in a concealed arrangement in a workpiece, for example power lines, water conduits and/or wooden beams, when guided along the workpiece by an operator using his hand, and advantageously ascertaining a position, particularly a distance from the appliance. Preferably, the handheld locating appliance has an appliance housing that is designed to be gripped by an operator for the purpose of guidance.

In addition, the disclosure is based on a handheld tool having a handheld tool apparatus according to the disclosure, as a result of which it is a particularly simple matter for a workpiece to be checked for locatable objects before a work process. In particular, a "handheld tool" is intended to be understood to mean a tool that appears useful to a person skilled in the art, but advantageously an electric drill, a hammer drill, a sledgehammer, a saw, a plane, a screwdriver, a milling machine, a grinder, an angle grinder, a garden implement and/or a multifunction tool. Preferably, the handheld tool has an appliance housing that is designed to be gripped by an operator for the purpose of guidance.

Further advantages will emerge from the description of the drawing that follows. The drawings shows exemplary embodiments of the disclosure. The figures, the description and the claims contain numerous features in combination. A person skilled in the art will expediently also consider the features individually and combine them into useful further combinations.

DETAILED DESCRIPTION

Figure 1:
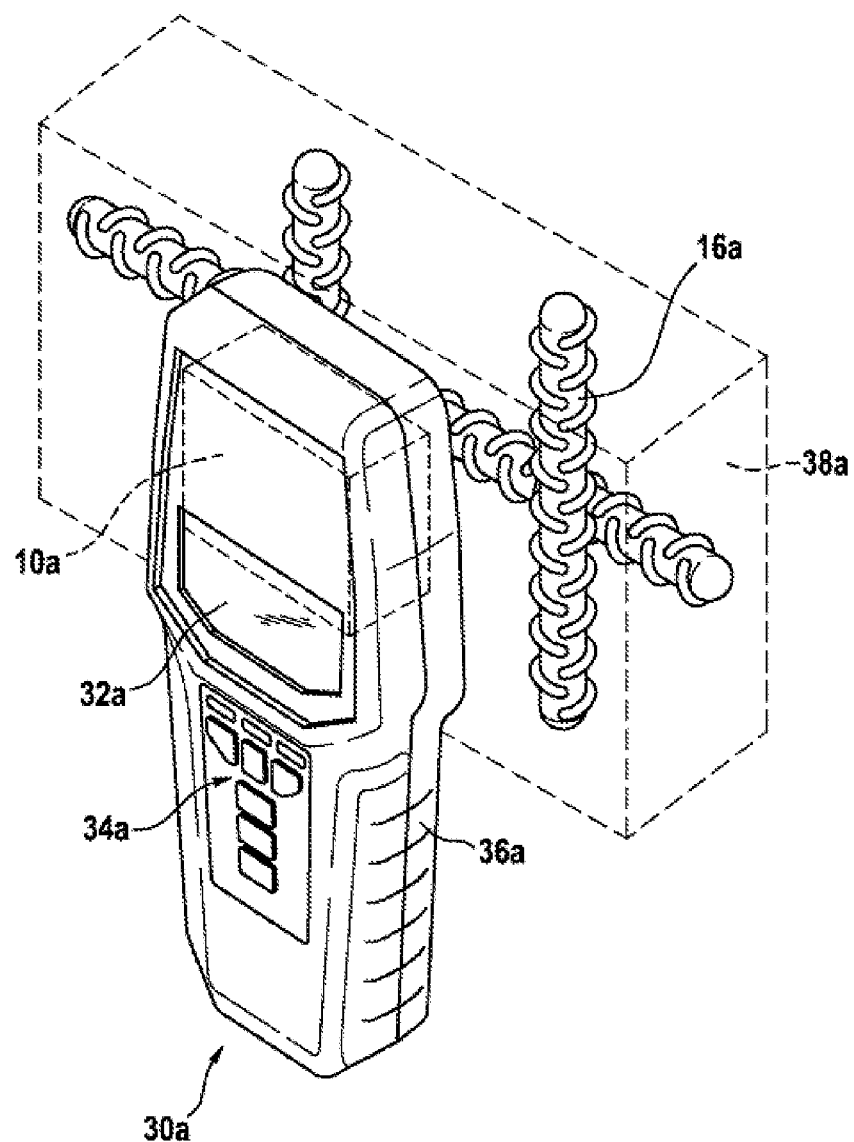
FIG. 1 shows a perspective illustration of a workpiece and a handheld locating appliance having a handheld tool apparatus according to the disclosure.

FIG. 1 shows a handheld locating appliance $30a$ having a handheld tool apparatus $10a$, a display unit $32a$, an input unit $34a$ and an appliance housing $36a$. The operator guides the handheld locating appliance $30a$ over a workpiece $38a$ during operating using the appliance housing $36a$. In this case, the handheld tool apparatus $10a$ sends a locating signal into the workpiece $38a$ from a side of the appliance housing $36a$ that is remote from the display unit $32a$. In this case, the workpiece $38a$ is in the form of part of a wall. During a locating process, a locatable object $16a$, in this case a piece of reinforcing ironwork, in a concealed arrangement in the workpiece $38a$ reflects a portion of the locating signal. The handheld tool apparatus $10a$ receives a portion of the locating signal and determines therefrom at least one piece of information about the locatable object $16a$. In this exemplary embodiment, the handheld tool apparatus $10a$ determines whether the locatable object $16a$ is arranged in a main radiation direction $40a$ in front of the locating antenna $20a$, and a depth at which the locatable object $16a$ is arranged.

Figure 2:
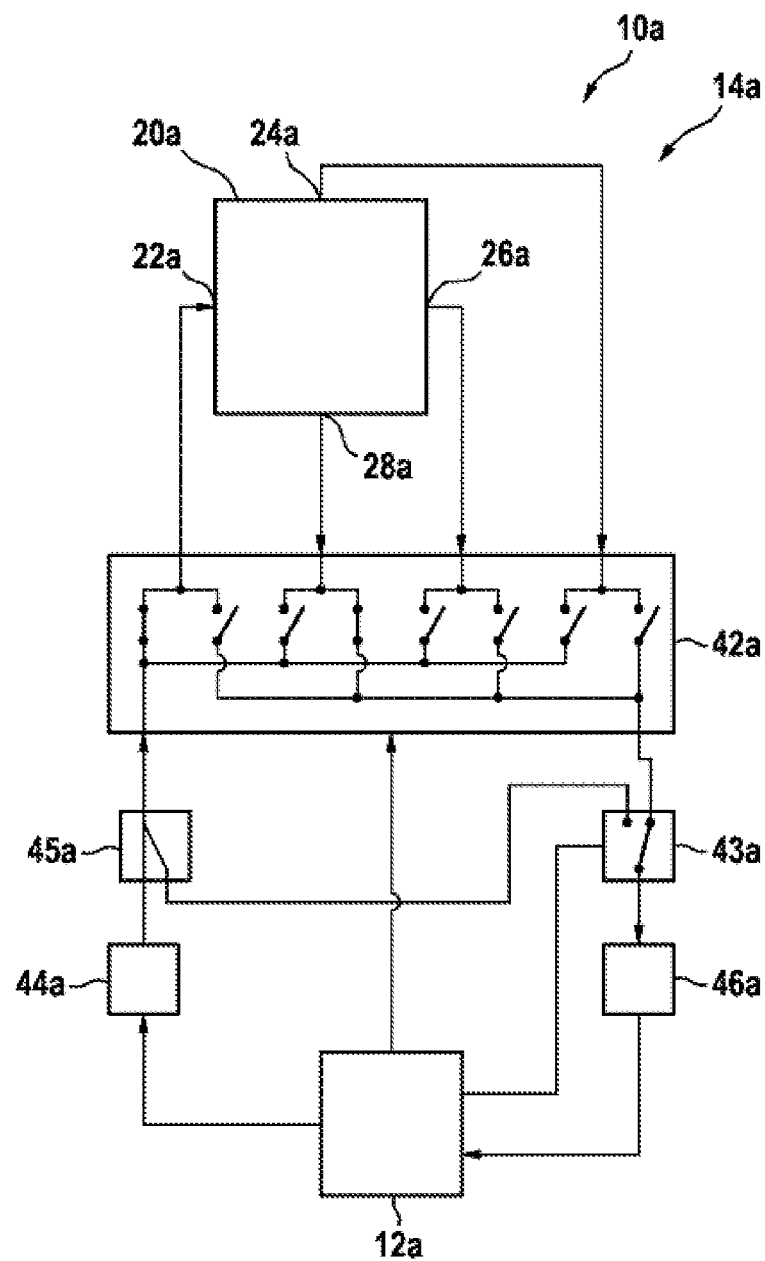
FIG. 2 shows a schematic illustration of a locating apparatus and a computation unit of the handheld tool apparatus from FIG. 1.

The handheld tool apparatus $10a$ shown in more detail in FIG. 2 comprises a computation unit $12a$ and a locating apparatus $14a$. The locating apparatus $14a$ has a locating antenna $20a$, antenna changeover switches $42a$, a signal generator $44a$, an antenna splitter $45a$ and an analog-to-digital converter $46a$. The signal generator $44a$ produces the locating signal. The locating signal has a bandwidth of 8 GHz and a center frequency of 5 GHz. The computation unit $12a$ controls the production of the locating signal. Alternatively or in addition, a signal generator could transmit a locating signal, in particular via an antenna changeover switch, to a computation unit that quantizes the unsent locating signal. The locating antenna $20a$ has four feed points $22a$, $24a$, $26a$, $28a$. The antenna splitter $45a$ is arranged between the signal generator $44a$ and one of the antenna changeover switches $42a$. It is in the form of a directional coupler. It forwards a locating signal coming from the signal generator $44a$ to the antenna changeover switch $42a$. Furthermore, it forwards a returning component of the locating signal, coming from the antenna changeover switch $42a$, in the direction of the analog-to-digital converter $46a$. The antenna changeover switch $42a$ forwards the locating signal to a single feed point $22a$, $24a$, $26a$, $28a$ of the locating antenna $20a$. The computation unit $12a$ controls the antenna changeover switches $42a$, $43a$. Hence the locating apparatus $14a$ is provided for the purpose of exciting a single one of the feed points $22a$, $24a$, $26a$, $28a$. The antenna changeover switch $42a$ successively routes the locating signal to all feed points $22a$, $24a$, $26a$, $28a$. It is shown that the antenna changeover switch $42a$ forwards the locating signal to a first of the feed points $22a$. Filters, amplifiers, mixers and modulators of the locating apparatus 14 are not shown in more detail. Alternatively, a locating apparatus could have two receivers, particularly with two analog-to-digital converters. In this case, one receiver could receive a locating signal reflected to a fed feed point and one receiver could receive a locating signal reflected to an unfed feed point. This allows the second antenna changeover switch 43 to be dispensed with.

Figure 3:
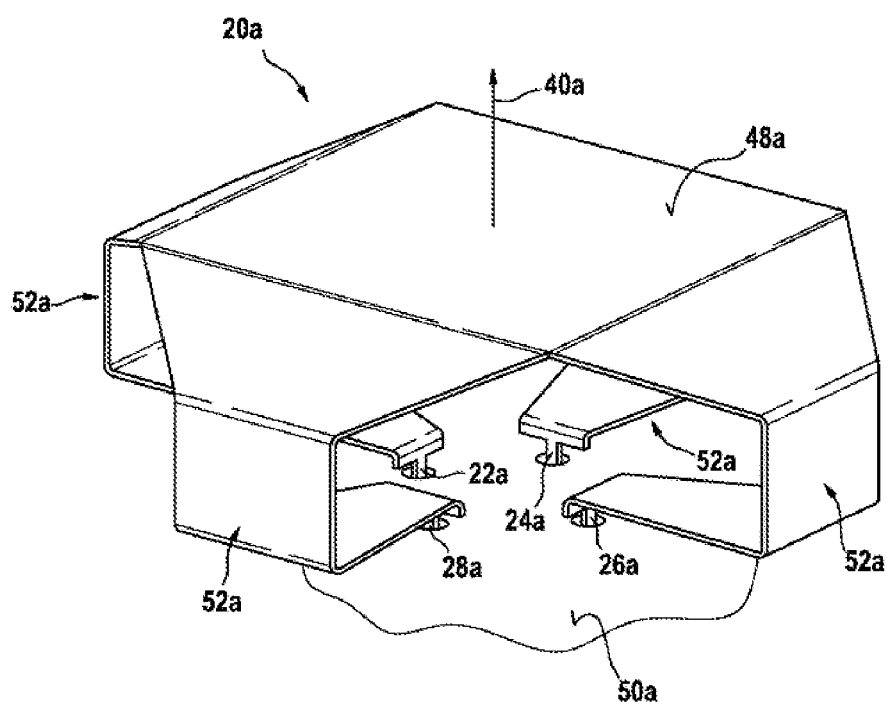
FIG. 3 shows a perspective illustration of a locating antenna of the locating apparatus from FIG. 2.

FIG. 3 shows the locating antenna $20a$ of the handheld tool apparatus $10a$. The locating antenna $20a$ is in the form of an LCR antenna. The locating antenna $20a$ comprises four feed points $22a$, $24a$, $26a$, $28a$, an antenna element surface $48a$, a ground plane $50a$ and four matching means $52a$. During operation, the locating antenna $20a$ sends and receives two orthogonal polarization directions for the locating signal separately from one another. To this end, the four feed points $22a$, $24a$, $26a$, $28a$ of the locating antenna $20a$ are individually excited and a received portion of the locating signal is output by the locating antenna $20a$ at the four feed points 22a, 24a, 26a, 28a. The ground plane 50a reflects a component of the locating signal that is sent in its direction by the antenna element surface 48a in the direction of the main radiation direction 40a.

During operation, the antenna element surface 48a sends and receives the locating signal in the main radiation direction 40a. Said antenna element surface has a square shape. The feed points 22a, 24a, 26a, 28a use the matching means 52a to excite the antenna element surface 48a to transmit the locating signal. In this case, the matching means 52a transform a characteristic impedance of the feed points 22a, 24a, 26a, 28a, in this case 50 ohms, to produce a characteristic impedance of the antenna element surface 48a, which in this case is less than 10 ohms. The matching means 52a have a trapezoidal profile from the feed points 22a, 24a, 26a, 28a to the antenna element surface 48a. The antenna element surface 48a and the matching means 52a are formed by a conductive surface of integral design.

In this case, the matching means 52a taper from the antenna element surface 48a in the direction of the feed points 22a, 24a, 26a, 28a. The feed points 22a, 24a, 26a, 28a are arranged on a level that is defined by the ground plane 50a. The ground plane 50a extends parallel to the antenna element surface 48a at the feed points 22a, 24a, 26a, 28a. A further embodiment of the locating antenna 20a can be found in the document DE 10 2008 041 651 A1.

The locating antenna 20a receives a portion of the locating signal reflected by the locatable object 16a, specifically both orthogonal linear polarization directions separate from one another. The feed points 22a, 24a, 26a, 28a forward the received portion of the locating signal to the antenna changeover switch 42a. Two of the feed points 22a, 24a forward a portion of the locating signal that is received with a first linear polarization direction. Two of the feed points 26a, 28a forward a portion of the locating signal that is received with a second linear polarization direction, which is orthogonal with respect to the first polarization direction. In this exemplary embodiment, the first polarization direction has a vertical orientation and the second polarization direction has a horizontal orientation. The antenna changeover switch 42a forwards the respective portion of the locating signal that is output by one of the unfed feed points 24a, 26a, 28a to the analog-to-digital converter 46a. It is shown that the antenna changeover switch 42a forwards the portion of the locating signal from a second of the feed points 24a to the analog-to-digital converter 46a. The analog-to-digital converter 46a successively quantizes the portions of the locating signal that come from the three feed points 24a, 26a, 28a.

The computation unit 12a has a locating routine that ascertains the position information for the locatable object 16a during a locating operation. The locating routine determines a circularly polarized component of the locating signal from the two quantized portions of the locating signal. To this end, the computation unit 12a determines two complex copolarization parameters $s_{vv}$, $s_{hh}$, and two complex cross-polarization parameters $s_{hv}$, $s_{vh}$ for the reflection. A first of the copolarization parameters $s_{vv}$ describes what component of the locating signal sent with the first polarization direction is reflected with the first polarization direction. A second of the copolarization parameters $s_{hh}$ describes what component of the locating signal sent with the second polarization direction is reflected with the second polarization direction. A first of the cross-polarization parameters $s_{hv}$ describes what component of the locating signal sent with the second polarization direction is reflected with the first polarization direction. A second of the cross-polarization parameters $s_{vh}$ describes what component of the locating signal sent with the first polarization direction is reflected with the second polarization direction. The scattering parameters $s_{vv}$, $s_{hh}$, $s_{hv}$, $s_{vh}$ each comprise information about an amplitude and a phase angle for the reflected components of the locating signal at different frequencies. In order to determine the copolarization parameters $s_{vv}$, $s_{hh}$, and the cross-polarization parameters $s_{hv}$, $s_{vh}$ for the locatable object 16a, scattering parameters for the locating antenna 20a, particularly crosstalk, are deducted from the quantized portion of the locating signal in the computation unit 12a. Preferably, the copolarization parameters $s_{vv}$, $s_{hh}$ and the cross-polarization parameters $s_{hv}$, $s_{vh}$ describe a difference between the sent locating signal and the reflected component of the locating signal.

The locating routine determines the circularly polarized component of the locating signal $s_{circ}$ using the formula:

$$s_{circ} = (s_{vv} - s_{hh}) + j(s_{hv} - s_{vh})$$

Hence, the computation unit 12a is provided for the purpose of determining the circularly polarized component of the locating signal from copolarization parameters and cross-polarization parameters for the locating signal. A signal propagation time from the locating antenna 20a to the locatable object 16a and back to the locating antenna 20a results in a phase shift that is proportional to the frequency of the locating signal in the frequency range. The computation unit 12 determines the phase shift at different frequencies from the circularly polarized component of the locating signal $s_{circ}$ and calculates the distance between the locating object 16a and the locating antenna 20a from the phase shift.

Figure 4:
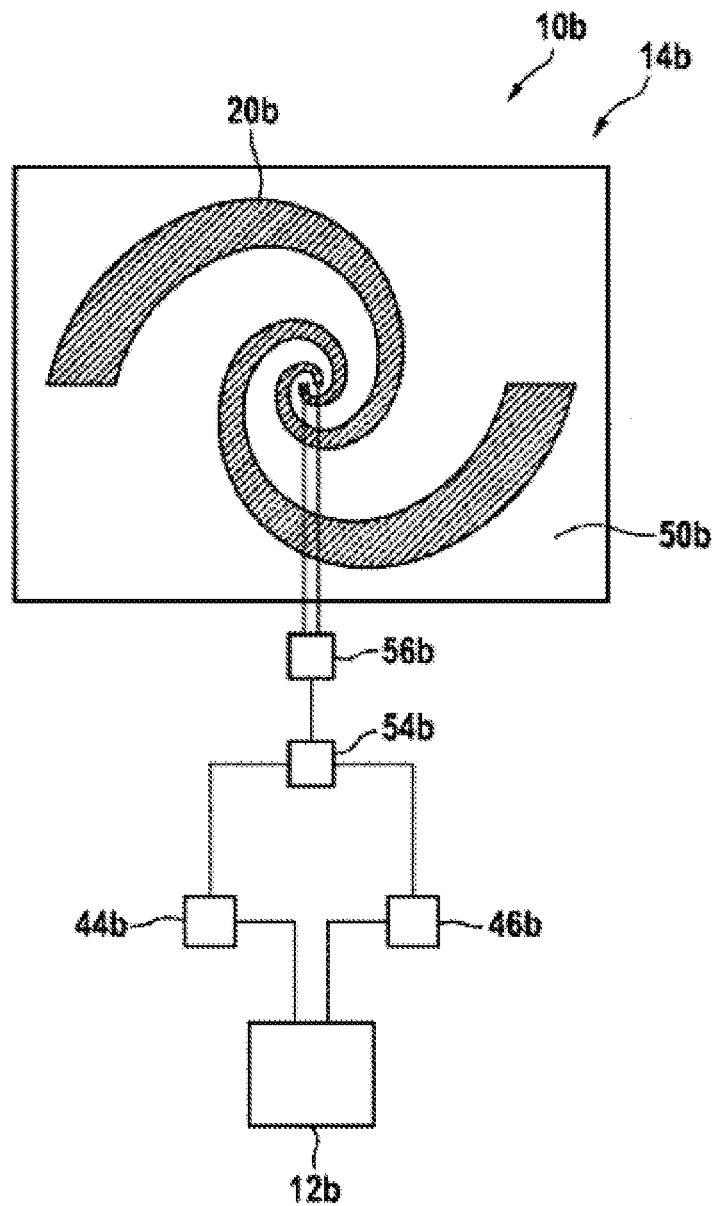
FIG. 4 shows a schematic illustration of an alternative exemplary embodiment of the handheld tool apparatus from FIG. 1.

FIG. 4 shows a further exemplary embodiment of the disclosure. The descriptions below and the drawing are essentially limited to the differences between the exemplary embodiments, reference being able to be made to the drawing and/or the description of the other exemplary embodiment in FIG. 1, in principle, for parts with the same designation, particularly for parts with the same reference symbols. In order to distinguish between the exemplary embodiments, the letter a follows the reference symbols for the exemplary embodiment in FIGS. 1 to 3. In the exemplary embodiments in FIG. 4, the letter a is replaced by the letter b.

FIG. 2 shows a handheld tool apparatus 10b having a computation unit 12b and a locating apparatus 14b. During operation, the locating apparatus 14b sends and receives a circularly polarized locating signal. The computation unit 12b uses determination of the circularly polarized component of the locating signal in order to ascertain position information for a locatable object. The computation unit 12b determines a complex value for a component of the locating signal that is reflected by the locatable object and from that a distance between the locatable object and the locating antenna 20b.

The locating apparatus 14b has a locating antenna 20b, a signal generator 44b, an analog-to-digital converter 46b, a ground plane 50b and an antenna splitter 54b. The locating antenna 20b is in the form of a spiral antenna. During operation, the locating antenna 20b sends and receives the circularly polarized component of the locating signal directly. In this case, the antenna splitter 54b routes the locating signal from the signal generator 44b to the locating antenna 20b and from the locating antenna 20b to the analog-to-digital converter 46b. The analog-to-digital converter 46b quantizes the reflected circularly polarized component of the locating signal. The locating apparatus 14b outputs the circularly polarized component of the locating signal to the computation unit 12b. Alternatively, an analog-to-digital converter and a computation unit could be of integral design at least to some extent. Furthermore, the locating apparatus 14b has a balun 56b that converts the locating signal for the purpose of differential feeding of the locating antenna.

The invention claimed is:

1. A handheld tool apparatus, comprising:
   a computation unit including a processor; and
   a locating antenna configured to receive a locating signal,
   wherein the processor is configured to ascertain at least one piece of position information of a locatable object by determining a circularly polarized component of the locating signal,
   wherein the locating antenna has an antenna element surface configured to transmit signals in at least two orthogonal, linear polarization directions and to receive reflections of the signals from the at least two orthogonal, linear polarization directions,
   wherein the processor configured to cause the locating antenna to transmit the locating signal separately in the at least two orthogonal, linear polarization directions,
   wherein the processor is further configured to determine the circularly polarized component from reflections of the locating signal received by the locating antenna from the at least two orthogonal, linear polarization directions, and
   wherein the processor is configured to ascertain the at least one piece of position information of the locatable object by determining a phase shift of the circularly polarized component of the locating signal.

2. The handheld tool apparatus as claimed in claim 1, wherein the processor is further configured to determine the circularly polarized component of the locating signal from at least one copolarization parameter and at least one cross-polarization parameter of the locating signal.

3. The handheld tool apparatus as claimed in claim 1, wherein the locating antenna includes at least one feed point for each of the at least two orthogonal polarization directions.

4. The handheld tool apparatus as claimed in claim 1, wherein the locating antenna is a large current radiator (LCR) antenna.

5. A method of using a handheld tool apparatus, comprising:
   transmitting a locating signal in at least two orthogonal, linear polarization directions separately using a locating antenna;
   receiving the locating signal from the at least two orthogonal, linear polarization directions at different frequencies separately with the locating antenna;
   determining a circularly polarized component of the locating signal received from the at least two orthogonal, linear polarization directions with a processor of a computational unit; and
   ascertaining at least one piece of position information of the locatable object from the circularly polarized component using the processor of the computational unit,
   wherein the processor ascertains the position information of the locatable object by determining a phase shift of the circularly polarized component of the locating signal.

6. A handheld tool apparatus, comprising:
   a computation unit including a processor; and
   a locating antenna having two orthogonal, linear polarizations, the locating antenna being configured to receive two components of a locating signal, the two components having the two orthogonal, linear polarizations, respectively,
   wherein the processor is configured to ascertain at least one piece of position information of a locatable object by determining a circularly polarized component of the locating signal from the two components of the locating signal having the two orthogonal, linear polarizations, respectively, and
   wherein the processor is further configured to determine the circularly polarized component of the locating signal from at least one copolarization parameter and at least one cross-polarization parameter derived from the two components of the locating signal.

* * * * *